United States Patent [19]

Psiuk et al.

[11] Patent Number: 5,405,660
[45] Date of Patent: Apr. 11, 1995

[54] METHOD OF GENERATING A WEAR-REDUCING LAYER ON A PLASTIFYING WORM OR SCREW

[75] Inventors: Werner Psiuk, Hanover; Michael Reuter, Brunswick, both of Germany

[73] Assignee: Friedrich Theysohn GmbH, Bad Oeynhausen, Germany

[21] Appl. No.: 139,617

[22] Filed: Oct. 18, 1993

Related U.S. Application Data

[63] Continuation of Ser. No. 830,120, Jan. 31, 1992, abandoned.

[30] Foreign Application Priority Data

Feb. 2, 1991 [DE] Germany ............... 41 03 179.2
Feb. 2, 1991 [DE] Germany ............... 41 03 180.6

[51] Int. Cl.⁶ .................. B05D 3/06; B23K 26/00
[52] U.S. Cl. .................. 427/597; 148/525; 219/121.66; 427/561
[58] Field of Search ............ 427/597, 596, 561, 556; 148/516, 525; 219/121.66, 121.85

[56] References Cited

U.S. PATENT DOCUMENTS

| | | | |
|---|---|---|---|
| 4,182,299 | 1/1980 | Earle et al. | 123/188 |
| 4,200,669 | 4/1980 | Schaefer et al. | 427/597 |
| 4,212,900 | 7/1980 | Serlin | 427/597 |
| 4,218,494 | 8/1980 | Belmondo et al. | 219/121.66 |
| 4,644,127 | 2/1987 | LaRocca | 427/596 |
| 4,750,947 | 6/1988 | Yoshiwara et al. | 219/121.6 |
| 5,038,014 | 8/1991 | Pratt et al. | 427/596 |
| 5,043,548 | 8/1991 | Whitney et al. | 427/596 |
| 5,122,632 | 6/1992 | Kinkelin | 427/597 |
| 5,182,430 | 1/1993 | Lagain | 427/556 |
| 5,268,045 | 12/1993 | Clare | 148/525 |
| 5,292,418 | 3/1994 | Morita et al. | 427/597 |

FOREIGN PATENT DOCUMENTS

| | | |
|---|---|---|
| 2452528 | 10/1980 | France . |
| 2501370A1 | 7/1926 | Germany . |
| 3740916A1 | 6/1989 | Germany . |
| 3718779 | 8/1990 | Germany . |
| 7185927 | 11/1982 | Japan ............ 427/597 |
| 576526 | 6/1976 | Switzerland . |
| WO91/14799 | 10/1991 | WIPO . |

OTHER PUBLICATIONS

Patent Abstracts of Japan, Appl. No. 52-27100; 53-112595; Nippon Denki K.K.; "Laser Working Device", Feb. 1978.

Patent Abstracts of Japan, Appl. No. 60-26435; 61-186421(A); Kawasaki Steel Corp.; "Production of Grain Oriented Silicon . . . ", Aug. 1986.

Reparaturbeschichten von Turbinenschaufeln, Laser-Metallbearbeitung, Thiemann et al., pp. 103-106, Oct. 1990, no translation.

Patent Abstracts of Japan, C-384, Nov. 13, 1986, vol. 10, #335, "Formation of Alloy on Metallic Surface with Laser", 61-139682(A) of Jun. 26, 1986.

*Primary Examiner*—Marianne Padgett
*Attorney, Agent, or Firm*—Herbert Dubno

[57] ABSTRACT

A coating of at least 71% by weight molybdenum as applied to the steel base body of a worm or screw for a plastifier or extruder for plastic materials and synthetic resin by introducing the coating material into a laser beam and directing the thus melted coating material and the laser beam onto the surface of the worm or screw to be coated. The melt-metallurgical bond is formed between the coating without distortion or crack formation of the base body.

9 Claims, 2 Drawing Sheets

METHOD OF GENERATING A WEAR-REDUCING LAYER ON A PLASTIFYING WORM OR SCREW

CROSS REFERENCE TO RELATED APPLICATION

This application is a continuation of Ser. No. 07/830,120, filed 31 Jan. 1992, now abandoned.

FIELD OF THE INVENTION

Our present invention relates to a method of producing a low-wear coating upon a surface of a worm or screw generally composed of steel and utilized for plastification of a synthetic resin or plastic material in an extruder, injection-molding apparatus, a feeder for plastic materials, a blender or masticator for such materials, or a device for subjecting such materials to shear forces.

More particularly, the invention relates to the improvement of such worms or screws by the formation of a molybdenum-containing coating on the surface of the steel body of the screw which is firmly bonded to that body.

BACKGROUND OF THE INVENTION

In German patent document 37 40 916, the application of a wear-reducing coating on the surface of a worm or screw for a plastifying device is disclosed in which molybdenum or a molybdenum-containing coating material is applied to a surface of the worm or screw body, the coating on the body is subjected to heat to effect fusion between the coating and the underlying base material, and the coated screw or worm is thereupon cooled.

As noted, the plastifying device can be an extruder, injection-molding machine or compounder and, for the purpose of this description, all such machines will be understood as comprised within the term "extruder" where that term is used to describe a machine or device embodying the invention.

An extruder can be used, for example, to produce articles of synthetic resin material, plastic or rubber and can comprise a housing and at least one worm or screw rotatable in this housing to displace the material to be processed through the housing. During the rotation of the worm or screw and the passage of the flow of the plastic or plastifiable material through the housing, the rib, thread or flight of the worm or screw may be subject to considerable and continuous wear.

In addition, there may be direct contact between the outer surface of the flight and the wall of the screw housing. To minimize mechanical deterioration of the parts in contact, good emergency running properties must be provided at the contact surfaces.

In the past this has generally been obtained by coating the outer surfaces of the flight or thread of the worm or screw with a suitable low-wear and low and reduced-friction material.

An appropriate material for this purpose is molybdenum. In Japanese patent document 61-139 682, molybdenum in pulverulent form is applied to the steel base material of the body and irradiated with laser energy. To ensure that the layer will bond firmly enough to the base material, before application of the powder, pits or depressions are generated in the surface to be coated. This pretreatment step makes the coating process complicated and expensive. Because molybdenum has a substantially higher melting point than the steel, a relatively large amount of thermal energy must be applied to the base body for effective bonding and this can give rise to deformation and cracking at the interface and surface.

Swiss patent 576,526 describes the application of a molybdenum coating to an extruder worm at the rib or thread surface by flame-spraying. According to German patent 37 18 779, this does not produce effective results because the layer with excessively high molybdenum content does not bond satisfactorily to the base body of the worm and has a tendency to spall off therefrom.

In German patent 37 18 779, an alloy is used as the material for the wear-reducing layer which contains between 40% and 70% molybdenum. This alloy can be applied to the base body by a special process, namely, plasma-powder deposition welding. The prior art process gives rise to useful results only upon the use of the expensive plasma-powder deposition welding which is of high capital cost. Furthermore, alloys are used with a molybdenum content of a maximum of 70%.

The advantageous characteristics of molybdenum, especially the good emergency running characteristics, can be utilized only with limitations. Even with this process, a relatively high amount of thermal energy must be transferred to the basic body and leading to unsatisfactory intrinsic stress characteristics with distortion and crack formation.

One could conclude that high molybdenum content with deposition welding utilizing coating materials available as powder would be obtainable by the method of German patent document 37 40 916. From the teachings of this document, the danger of crack formation in the generation of the wear-reducing coating of powder can be reduced by reduction of the molybdenum content in the coating material. In this conventional process, the protective coating is applied by thermal spraying onto the base body and by then melting the coating into the material of the base body by a laser beam remelting step. The coating material can be molybdenum or an alloy predominantly consisting of molybdenum. Even in this two-stage process, relatively high quantities of thermal energy must be applied to the base body during the thermal spraying and here as well the undesirable intrinsic stress conditions can result in distortion and crack formation.

OBJECTS OF THE INVENTION

It is, therefore, the principal object of the present invention to provide an improved method of producing a wear-resistant coating on a steel worm or screw for an apparatus of the type described, whereby distortion and crack formation in the product can be excluded.

Another object of this invention is to provide an improved method of forming a wear-resistant molybdenum-containing coating on the steel body of a worm or screw such that the coating is highly adherent to the steel body.

SUMMARY OF THE INVENTION

These objects and others which will become apparent hereinafter are attained, in accordance with the invention, by introducing a coating material containing at least 71% by weight molybdenum into a laser beam in which the coating material is melted by the laser beam energy and carried in the laser beam to the steel body of a worm to which the coating material is applied at an outer surface and by melting at least an outer portion of the steel body in the region in which it is coated with molybdenum-containing material. The result is an effective fusion of the coating material with the molten layer or surface of the steel body.

More particularly, the method of forming a wear-reducing coating on a surface of a screw or worm of a plastifying apparatus for synthetic resin or plastic material comprises the steps of:

(a) feeding a coating material consisting at least 71% by weight of molybdenum into a laser beam;

(b) melting the coating material in the laser beam;

(c) applying molten coating material formed in step (b) and the laser beam to a surface of the body and simultaneously melting at least on outer region of the surface with the laser beam to deposit the coating material on the surface and effect diffusion between the outer region and the coating material; and (d) cooling the screw and the coating material thereon.

Surprisingly, notwithstanding the teachings of German patent 37 18 779 and the opinion of the art based thereon, a coating material containing at least 71% by weight molybdenum can be so applied to the metallic substrate or body that a pore-free layer of the coating material is formed thereon with a bonding strength which corresponds at least to the strength or integrity of the coating material and which will, therefore, not peel or ablate from the base body.

It has been found in practice that the coating material applied in this fashion does not separate from the base body even upon the application of extreme stresses or loads thereto. This surprising result appears to derive from an effective combination of a laser beam with the way of feeding of the coating material during the connecting of the coating material with the basic material in the single stage process.

The coating material and the surface of the base body are melted spatially and temporally separately from one another but, since the melting temperature of the steel body is less than that of the molybdenum-containing coating material, the arrival of the molten coating material at the surface of the base body allows the coating material to fuse to the molten material of the base body and permits, at least in a transition zone of the base body, an interdiffusion of the two materials and the formation of a melt-metallurgical bond between them. The sharp interface thus does not exist.

Only comparatively little thermal energy need be introduced into the base body so that only a relatively thin layer on the surface thereof is heated to the melting point thereof by the laser beam. The danger of distortion with or without crack formation is therefore excluded.

The process of the invention has the further advantage that the cost of preparation of the surface to be coated of the substrate body can be held to a minimum. For example, it is not necessary to provide pits or depressions in the surface to be coated. The method of the invention has been found to be effective for the treatment of articles of complex geometry and for the selective coating of certain regions of the body. For example, it is possible to form the wear-resistant layer only on the outer surface of the flight, rib or thread of the worm or screw.

According to a feature of the invention, the coating material is fed at an acute angle to the laser beam and a single starting laser beam can be split into a plurality of treating laser beams by the use of appropriate laser optical techniques. The screw can be rotated during the deposit of the coating material in a rotational sense such that the coating material is injected into the laser beam from behind in the sense of rotation.

The surface of the substrate body can be coated with the coating material by sweeping the laser beam in a zigzag or meander pattern on the surface.

The coating material can be a solid or an agglomerate of particles and can be pure molybdenum or a molybdenum alloy.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
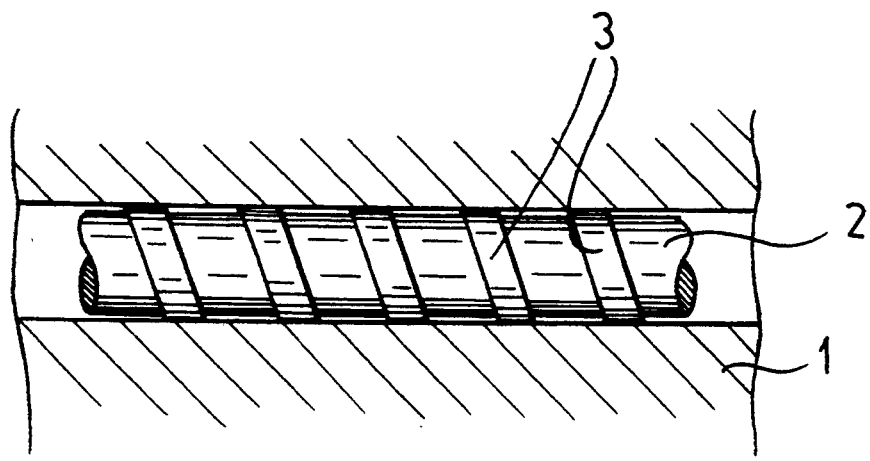
FIG. 1 is a diagrammatic section of an extruder provided with a housing and screw according to the invention.
Figure 2:
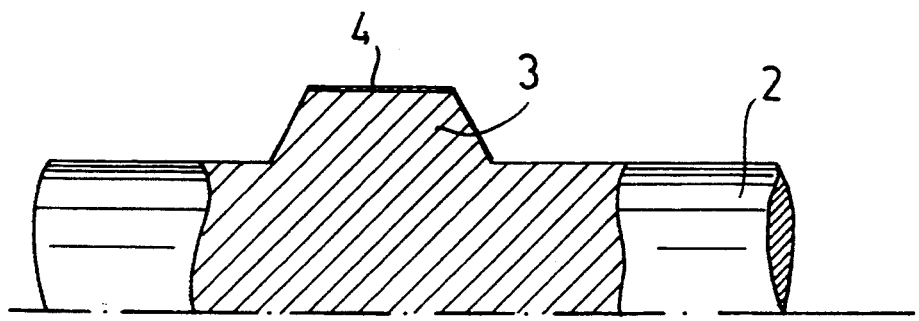
FIG. 2 is a cross sectional view showing a portion of a worm or screw provided with a wear-resistant coating according to the invention.

Referring first to FIG. 1, it can be seen that an extruder can comprise a housing 1 receiving a screw or worm 2 with flight, threads or ribs 3 which, in the regions engageable with the housing, are provided with a coating of pure molybdenum or of a molybdenum alloy, the coating material being represented at 4 in FIG. 1 and having a molybdenum content of at least 71%.

The coating 4 is provided with a fusion bond to the steel body of the worm 2 and for that purpose the technique used in the German journal "Laser-Praxis" October 1990, pages LS 101 to LS 106 can be used. In that article, the coating of turbine blades with high-strength nickel-based alloys with a molybdenum content of up to 6% or cobalt based alloys without molybdenum is described. According to the invention, the coating material fed to the laser beam otherwise using that process contains 71% by weight molybdenum at the least.

According to the invention, the coating material consisting of molybdenum or of a molybdenum alloy is provided preferably in the form of an agglomerated powder. It can also be provided in the form of a wire, a melt or as a preheated mass.

The laser can be any laser with sufficient power, for example a CO laser, a $CO_2$ laser, a Nd-YAG laser or an Nd-glass laser, operated with continuous or pulse mode.

To optimize the coating process and maximize favorable characteristics of the coating, a combination of a plurality of lasers of the same or different types may be used. The multibeam technique for producing the coating may be generated from a single high power laser by beam-splitting techniques. The best mode involves the use of a $CO_2$ laser with continuous mode.

The coating material can be fed to the beam by a powder feeder, for example. The output of the device for feeding the coating material determined substantially to the speed with which the material can be applied to the surface to be coated. This in turn, is matched to the laser power. The energy of the laser must be sufficient to melt the coating material on the way to the surface to be coated of the worm 2. Since the melt temperature of the base body composed of steel is less than that of the coating material, the surface of the base body as the already molten coating material is applied together with the energy of the laser beam will be melted to generate a melt-metallurgical bond between the two materials without significant heat input into the base body of the worm 2.

Intrinsic stresses with deformation and crack formation in the coated body cannot arise.

By influencing the laser beam in terms of beam guidance and beam formation, for example, by oscillating optics, facetted mirrors, diaphragms, beam-splitting and the like, a variety of point or streak coating patterns can be applied to the rib or thread 3 of the coating material with fusion bonding to the base or substrate.

The beam cross section can be circular with ground modes with a Gaussian power distribution. The rib or thread of the worm can thus be coated taking into consideration its pitch.

The preferably used ground-mode radiation of the $CO_2$ laser generates coating traces on the surface of the thread 3 of the worm 2 whose width depends substantially upon the laser power and the beam spot diameter. It is as a rule a number of times smaller than the width of the rib or thread 3. As a consequence, the laser beam must be scanned over the entire width and length of web or rib 3. This can be effected by applying to the relative movement of the laser beam with respect to the surface to be coated a pattern having translatory and rotation components. Both components can be applied to the laser beam or to the worm or one component of movement can be applied to the laser beam while the other is applied to the worm.

Figure 3:
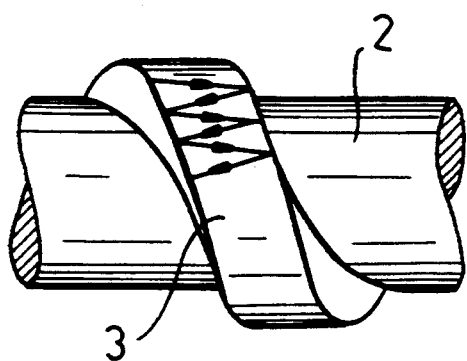
FIG. 3 is an elevational view showing a zig-zag coating pattern.
Figure 4:
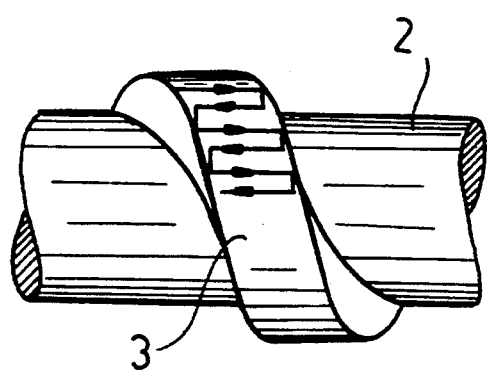
FIG. 4 is an elevational view showing a meander coating pattern.

A suitable pattern as shown in FIG. 3 is a zigzag pattern in which the beam is played upon the rib or web 3 continuously back and forth between the flanks of the rib or web by imparting a translatory motion to the laser and by rotating the worm 2 continuously about its axis to impart the rotation component to the worm. The peripheral speed of the worm determines the degree of overlapping of the coating process applied to the worm. Another readily generated pattern is the meander pattern shown in FIG. 4 in which the laser beam is translated between the flanks of the rib or web 3 and the rotation of the worm or web is effected discontinuously or periodically so that the worm is stationary during each translation.

Figure 5:
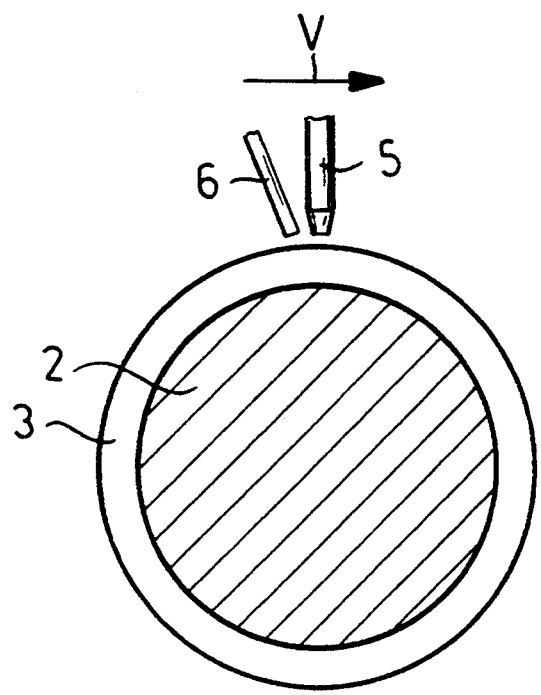
FIG. 5 is a cross sectional view illustrating an embodiment of an apparatus according to the invention.

The impingement angle of the coating material upon the rib or web 3, the angle between the laser beam and the feed device for feeding the coating material thereto and the arrangement of the laser beam and the feed device with respect to the axis of the worm 2 can be freely selected. In a preferred embodiment, the laser beam 5 and the feed device 6 are so arranged as has been illustrated in FIG. 5, that the laser beam 5 is directed preferably vertically from above perpendicular to the rib or thread 3. The coating material supplied by means of the feed device 6 is preferably injected into the beam at an angle of 18° behind the laser with respect to the sense of rotation of the worm 2 as represented by the arrow V.

Figure 6:
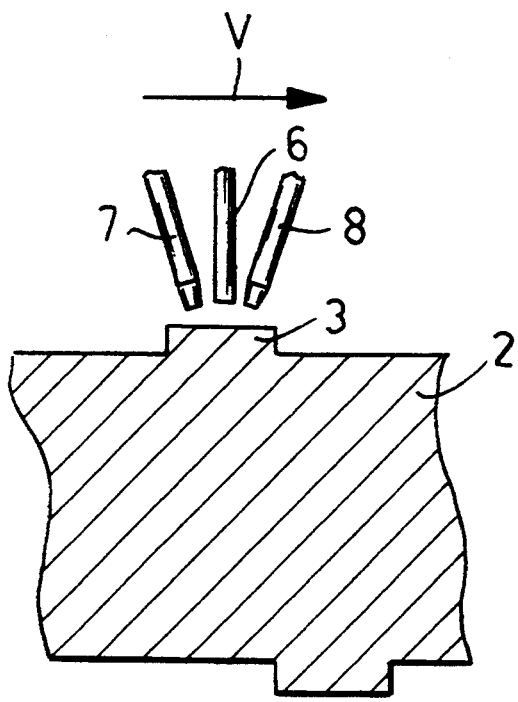
FIG. 6 is a cross-sectional view illustrating another embodiment of the apparatus according to the invention.
Figure 7:
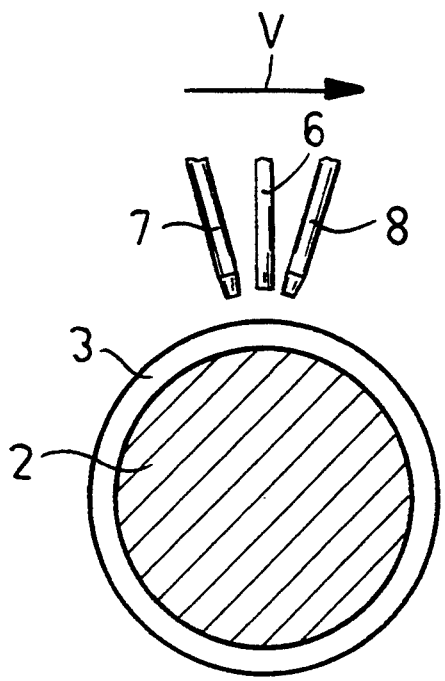
FIG. 7 is a cross-sectional view illustrating still another embodiment according to the invention.

According to FIGS. 6 and 7, the laser beam can be split by suitable optics from an initial laser beam into two laser beams 7, 8. The arrangement thus provides the laser beam 7, feed device 6 and the laser beam 8 spaced in the direction of the axis of the worm 2 (FIG. 6) or in the direction of the circumference or periphery of the worm (FIG. 7). In the case of the two laser beams, their orientation to a surface normal to the rib or web 3 can be different to protect the laser treatment head from excessive heat loading.

In this embodiment as well, the laser beams 7 and 8 are preferably directed onto the rib or thread 3 vertically from above. Instead of a split laser beam, two separate lasers can be used if desired.

The quality of the coating and the thickness of the transition zone between the applied coating and the base body and hence the degree of alloying in the diffusion zone can be optimized by the treating parameters used.

One of these parameters can be the powder mass per unit time introduced into the laser beam or the so-called powder rate. The movement of the laser beam relative to the coating surface can be a significant treating parameter in this sense. The parameters are always adjusted so that the coating is pore and crack-free.

It has been found to be advantageous from this point of view to use a protective gas, for example argon, to flood the coating area. The adhesion of the layer 4 of the base body of the worm 2, because of the melt-metallurgical bond, is at least as great as the cohesion within the layer 4. Only minor machining is necessary for the layer 4 and this may be done by grinding.

SPECIFIC EXAMPLES

Example 1

Unalloyed molybdenum with a melt temperature of 2620° C. is used as the coating material. The molybdenum is employed in the form of an agglomerated powder with a particle size of 45 to 90 μm. The powder is melted in the laser beam and entrained therewith to the worm to be coated.

The basic body in this example is f.e. low alloyed carbon steel usual using for the nitriding process containing 0.3% carbon, 0.5% manganese, 2.5% chromium, 0.2% molybdenum and 0.15% vanadium. The screw made from this steel is f.e. 2380 mm long and has f.e. 6 zones. So the width of the thread which was to be coated was fluctuated between f.e. 9.6 to 20.8 mm. The screw is coated with a 5 KW—continuous wave—CO-Laser using the zigzag pattern. The result was a pore- and crack-free coating with a hardness of 500 HV 0.1 and thickness of 700 to 90-0 my.

Example 2

The coating material was a molybdenum alloy of the following composition:
75% Molybdenum
3.5% Chromium
2.0% Boron
2.5% Silicon
Balance Nickel This alloy was fed to the laser beam in a particle size of 45 to 90 μm entrained in argon gas.

Using the same body and the same laser like in Example 1 the result was also a pore0 and crack-free coating with a hardness of 500–600 HV 0.1 and a thickness of 700 to 800 my. After coating of the worm, the coating was cooled in air.

We claim:

1. A method of forming a wear-reducing coating on a surface of a screw of a plastifying apparatus for plastic, said screw having a body of-steel, said method comprising the steps of:
   (a) feeding a coating material along a path thereof from a powder feed and consisting at least 71% by weight of molybdenum into a laser beam;
   (b) melting said coating material in said laser beam at a first location at a first melting temperature along said path;
   (c) applying molten coating material formed in step (b) and said laser beam to a surface of said body having a melting temperature lower than said first temperature and, simultaneously with application of said molten material to said surface, melting at least an outer region of said surface downstream of said first location along said path with said laser beam to deposit said coating material on said surface and to effect diffusion between said outer region and said coating material, thereby forming a pore-free and crack-free coating of the surface with at least 71% by weight molybdenum; and
   (d) cooling said screw and the coating material thereon.

2. The method defined in claim 1 wherein said coating material is fed, in step (a), at an acute angle to said laser beam.

3. The method defined in claim 1 wherein said laser beam is formed by splitting a starting laser beam.

4. The method defined in claim 1 wherein said screw is rotated during the deposit of said coating material on said surface.

5. The method defined in claim 1 wherein said surface of said body is coated with said coating material by sweeping said laser beam in step (c) in a zigzag pattern on said surface.

6. The method defined in claim 1 wherein said surface of said body is coated with said coating material by sweeping said laser beam in step (c) in a meander pattern on said surface.

7. The method defined in claim 1 wherein said coating material is an agglomerate of particles or a coating wire.

8. The method defined in claim 1 wherein said coating material is pure molybdenum.

9. The method defined in claim 1 wherein said coating material is an alloy of molybdenum.

* * * * *